United States Patent
Chung

(10) Patent No.: US 6,890,039 B2
(45) Date of Patent: May 10, 2005

(54) INDEPENDENTLY ROTATING WHEELS

(75) Inventor: I-Chao Chung, Troy, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 237 days.

(21) Appl. No.: 10/091,630

(22) Filed: Mar. 6, 2002

(65) Prior Publication Data

US 2003/0168905 A1 Sep. 11, 2003

(51) Int. Cl.$^7$ ............................................. B60B 11/00
(52) U.S. Cl. ..................................... 301/36.2; 384/271
(58) Field of Search .............................. 301/36.2, 36.1, 301/36.3; 384/271, 275

(56) References Cited

U.S. PATENT DOCUMENTS

| 515,057 | A | | 2/1894 | Canfield |
| 1,809,699 | A | * | 6/1931 | Higbee ........................ 301/36.2 |
| 1,914,266 | A | | 6/1933 | Leupold |
| 1,919,925 | A | | 7/1933 | Blakeslee |
| 1,975,206 | A | | 10/1934 | Fuhrman |
| 1,979,598 | A | * | 11/1934 | Ash ........................ 180/24.03 |
| 1,994,719 | A | | 3/1935 | Lichty |
| 2,001,875 | A | | 5/1935 | Higbee |
| 2,030,548 | A | | 2/1936 | Smeets |
| 2,082,001 | A | | 6/1937 | Hanson |
| 2,082,292 | A | | 6/1937 | Kendall |
| 2,126,960 | A | | 8/1938 | Higbee |
| 2,132,029 | A | | 10/1938 | Higbee |
| 2,135,568 | A | * | 11/1938 | Durham et al. ............ 188/18 R |
| 2,136,125 | A | | 11/1938 | Delaval-Crow ............. 308/236 |
| 2,142,787 | A | | 1/1939 | Higbee ........................ 180/22 |
| 2,154,497 | A | | 4/1939 | Durham ........................ 188/18 |
| 2,182,560 | A | | 12/1939 | Higbee ....................... 280/96.1 |
| 2,192,023 | A | | 2/1940 | Ash |
| 2,206,216 | A | | 7/1940 | Ash ............................ 280/96.1 |
| 2,210,572 | A | | 8/1940 | Durham ........................ 180/22 |

(Continued)

FOREIGN PATENT DOCUMENTS

| DE | 3811398 | 10/1989 |
| FR | 2203324 | 4/1974 |

OTHER PUBLICATIONS

U.S. Appl. No. 09/548,228.
U.S. Appl. No. 09/258,386.
U.S. Appl. No. 09/943,015.

Primary Examiner—Frantz F. Jules
(74) Attorney, Agent, or Firm—Howard & Howard

(57) ABSTRACT

A wheel end assembly having a dual wheel configuration includes independently rotating wheel hubs to reduce tire wear. Each wheel hub is supported on an axle spindle via a bearing member. Another bearing member is mounted between the wheel hubs to allow each wheel hub to rotate independently from the other. A fastening assembly retains the hubs on the spindle to prevent linear movement along the spindle.

12 Claims, 3 Drawing Sheets

U.S. PATENT DOCUMENTS

| | | | |
|---|---|---|---|
| 2,213,473 A | 9/1940 | Peterman | |
| 2,214,457 A | 9/1940 | Fuhrman | |
| 2,239,674 A | 4/1941 | Frederickson | 180/22 |
| 2,242,454 A | 5/1941 | Cochran | |
| 2,243,181 A * | 5/1941 | Altemus | 180/24.03 |
| 2,252,205 A | 8/1941 | Reynolds | 180/22 |
| 2,260,828 A | 10/1941 | Burger | |
| 2,264,785 A | 12/1941 | Ash | 180/22 |
| 2,267,362 A | 12/1941 | Ash | |
| 2,270,918 A | 1/1942 | Ash | 301/13 |
| 2,298,333 A | 10/1942 | Ash et al. | 301/5 |
| 2,298,334 A | 10/1942 | Ash | |
| 2,303,598 A | 12/1942 | Ash | 301/6 |
| 2,305,836 A | 12/1942 | Ash | |
| 2,343,129 A | 2/1944 | Ash | 301/36 |
| 2,353,730 A | 7/1944 | Joy | 180/66 |
| 2,357,343 A | 9/1944 | Morgan | 180/22 |
| 2,386,917 A | 10/1945 | Thornton | |
| 2,389,339 A | 11/1945 | Ash | |
| 2,397,673 A | 4/1946 | Lewis | |
| 2,398,348 A | 4/1946 | Ash | |
| 2,441,807 A | 5/1948 | Francis | 280/124 |
| 2,459,347 A | 1/1949 | Tolman | |
| 2,482,824 A | 9/1949 | Alden | 301/36 |
| 2,569,861 A | 10/1951 | Moore et al. | 301/36 |
| 2,576,258 A * | 11/1951 | Marsh | 301/36.1 |
| 2,727,582 A | 12/1955 | Lisenby | |
| 2,773,723 A | 12/1956 | Randall | |
| 2,905,505 A | 9/1959 | Delker | |
| 2,935,278 A | 5/1960 | Lesley | |
| 2,988,400 A | 6/1961 | Ash | 301/36 |
| 3,027,959 A | 4/1962 | Mailliard | |
| 3,534,825 A | 10/1970 | Reffle | |
| 3,770,074 A | 11/1973 | Sherman | |
| 3,971,606 A * | 7/1976 | Nakano et al. | 384/97 |
| 4,077,279 A | 3/1978 | Goscenski, Jr. | 74/711 |
| 4,138,168 A | 2/1979 | Herlitzek | 308/189 |
| 5,056,871 A | 10/1991 | Sbarro | 301/36 |
| 5,058,016 A | 10/1991 | Davidovitch | 364/424 |
| 5,258,912 A | 11/1993 | Ghoneim et al. | 364/424 |
| 5,290,069 A * | 3/1994 | Kallenberger | 384/129 |
| 5,887,983 A * | 3/1999 | Gulian et al. | 384/296 |
| 5,971,413 A * | 10/1999 | El-Kassouf | 280/124.111 |
| 6,206,798 B1 | 3/2001 | Johnson | 475/6 |
| 6,254,193 B1 | 7/2001 | Bowman | |
| 6,267,188 B1 | 7/2001 | Bowman | |
| 6,298,932 B1 | 10/2001 | Bowman | |
| 6,345,868 B1 | 2/2002 | Bowman et al. | 301/36.2 |
| 6,419,325 B1 | 7/2002 | Bowman et al. | 301/36.2 |
| 6,471,301 B1 | 10/2002 | Johnson | 301/36.2 |
| 6,527,073 B1 | 3/2003 | Bowman et al. | 180/24.03 |

\* cited by examiner

INDEPENDENTLY ROTATING WHEELS

BACKGROUND OF THE INVENTION

This invention relates to an axle assembly having multiple wheels at each end of the axle in which one wheel on one axle end is permitted to rotate relative to the other wheels on the same axle end. More specifically, the invention relates to bearing members that support adjacent wheel hubs to achieve independent relative rotation during turns.

Axle assemblies have typically incorporated dual wheels on either end of the axle to increase the load bearing capacity for heavy duty vehicles. Typically the pair of wheels on each end of the axle assembly is secured together so that they rotate at the same speed about an axis even during turns. Most off-highway vehicles, such as lift trucks, container handlers, front end loaders, etc., have duty cycles that include numerous turning maneuvers, which cause significant tire wear. The tire wear is a direct result of tire scrub, or drag, caused by wheels that are rigidly secured together for rotation at the same speed but which must travel different distances at the inside and outside of the turning radius. Tire wear and maintenance on heavy duty off-highway vehicles due to scrub cost thousands of dollars annually per vehicle.

Additionally, tire scrub reduces vehicle stability during turning maneuvers. As a vehicle moves through a turn, tire scrub detracts from the net ground coefficient necessary for traction, braking, and side forces in turns. Tire scrub also causes premature wear of various wheel end components, such as wheel rims. The wheel rims can fail prematurely due to added stresses caused by repeated tire scrub. Finally, tire scrub increases fuel consumption as well as powertrain wear and tear in drive axles.

For the above reasons, it would be desirable to reduce tire scrub by having a wheel end that allows adjacent wheel hubs to rotate independently relative to one other to allow each tire to rotate at different speeds through a turn.

SUMMARY OF THE INVENTION

A wheel end assembly having a dual wheel configuration includes independently rotating wheel hubs to reduce tire wear. In a disclosed embodiment of this invention, the wheel end assembly includes a spindle defining an axis of rotation a first wheel hub supported on the spindle by a first bearing member and a second wheel hub supported on the spindle by a second bearing member for rotation about the axis. A third bearing member is mounted between the first and second wheel hubs to support and permit the first and second wheel hubs to rotate independently from each other under predetermined conditions. In straight path operation the wheel hubs rotate together at the same speed, but during turns the third bearing member allows each wheel hub to turn at an ideal speed for that respective wheel hub.

Preferably a fastening assembly is mounted at one end of the spindle to retain the wheel hubs on the spindle. The fastening assembly also prohibits linear movement of the wheel hubs along the axis.

In one disclosed embodiment, the third bearing member is positioned between the first and second bearing members along the axis. Preferably, the third bearing member is solely supported between the first and second wheel hubs to allow each wheel hub to rotate independently from the other.

The subject invention offers a simple and compact design for independently rotating wheel hubs that significantly reduces tire wear resulting in less vehicle down time and which decreases overall maintenance cost. Further, because tire scrub is eliminated vehicle stability is improved and fuel economy is improved. The subject invention, described above for a dual wheel configuration, can easily be extended to multiple-wheel configurations.

These and other features of the present invention can be best understood from the following specifications and drawings, the following of which is a brief description.

DETAILED DESCRIPTION OF A PREFERRED EMBODIMENT

Figure 1A:
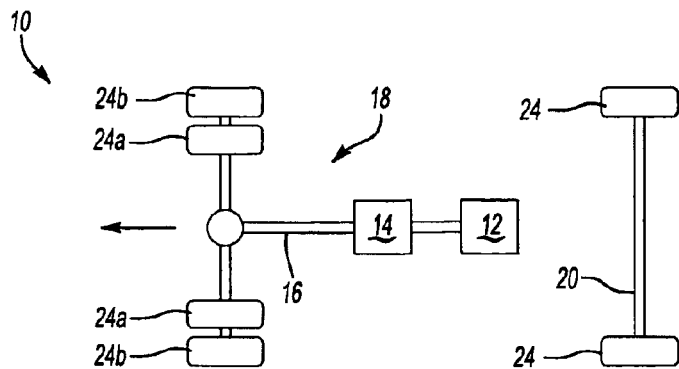
FIG. 1A is a schematic view of a typical off-highway vehicle powertrain.
Figure 1B:
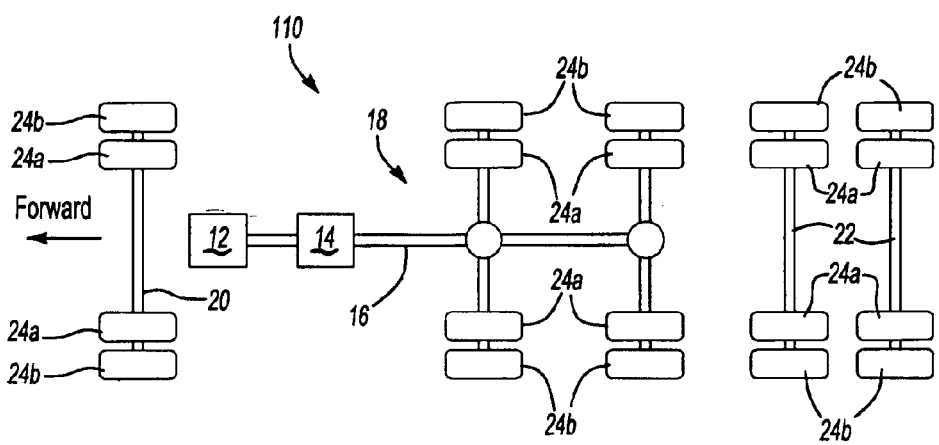
FIG. 1B is a schematic view of a typical on-highway vehicle powertrain.

FIG. 1A shows an overhead schematic view of a typical vehicle driveline 10 for a heavy-duty off-highway vehicle. FIG 1B shows a typical on-highway vehicle driveline 110. The drivelines 10, 110 include an engine 12 coupled to a transmission 14, which together provide driving input torque to a drive shaft 16 that extends to a drive axle 18. The drive axle 18 can be a single drive axle or a tandem drive axle. The vehicle also typically includes non-driving axles such as a front non-drive steer axle 20 and in the on-highway configuration, trailer axles 22.

Typically each axle 18, 20, 22 includes a wheel end assembly with dual wheels 24a, 24b on either end of the respective axle to increase the load bearing capacity for the heavy duty vehicle. As the vehicle maneuvers through a turn, the outer wheel 24b on the wheel end on the outside of the turn has a greater distance to travel than the inner wheel 24a. Conversely, on the inside of the turn, the inner wheel 24a travels farther than the outer wheel 24b. Typically, the dual wheels are rigidly connected to each other so that each wheel 24a, 24b rotates at the same speed through the turn. This causes tire scrub, which results in premature tire wear and wheel end component wear.

The subject invention allows each of the wheels 24a, 24b to rotate independently from each other so that tire scrub is eliminated during turning operations. It should be understood that this invention can be used in any type of axle that incorporates dual wheels and that while the invention is especially useful in off-highway vehicle applications as shown in FIG. 1A, the invention can also be used in an on-highway configuration, shown in FIG. 1B. A preferred application is a heavy-duty lift truck that utilizes a single front drive axle 18 as shown in FIG. 1A with dual wheels 24a, 24b on each end.

Figure 2:
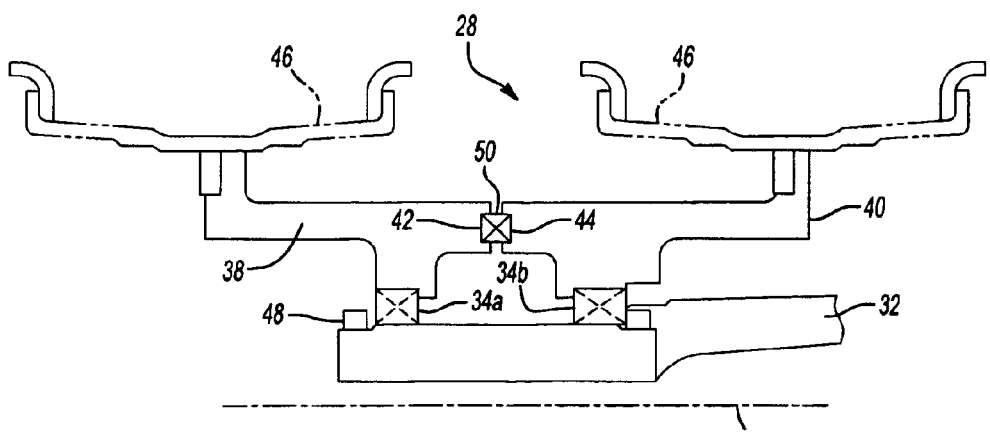
FIG. 2 is a cross-sectional view of a top half of one embodiment of a wheel end assembly incorporating the subject invention.

A wheel end assembly 28 is shown in FIG. 2. The wheel end assembly 28 includes a spindle 32 or other support shaft member that defines a wheel axis of rotation 30. As discussed above, the wheel end assembly 28 can be used on either a driving or non-driving axle. The wheel end assembly 28 further includes a first wheel hub 38 and a second wheel hub 40 that are supported adjacent to each other on the spindle 32 via first and second bearing members further defined as bearings 34a, 34b. Typically, taper roller bearings are used for heavy-duty applications. Further, it should be understood that the bearings 34a, 34b can be the same but do not have to be equal with each other.

A third bearing member 50 is mounted between the hubs 38, 40 to permit the hubs 38, 40 to rotate relative to one another about the axis 30. Preferably, the third bearing member 50 is solely supported between the hubs 38, 40, i.e., the third bearing member 50 is not supported on the spindle 32. The third bearing member 50 is mounted on opposing faces 42, 44 of the hubs 38, 40 and is not supported by the spindle 32. Wheel rims 46 are mounted to each hub 38, 40 and the tires 24a, 24b are mounted to the respective rims 46. A fastening assembly is used to hold the assembly together on the spindle 32. Preferably, a nut 48 mounted on the outer end of the spindle 32 retains the hubs 38, 40 in the proper axial location and prevents any linear movement along the axis 30. While the nut 48 is preferred, other known fasteners could also be used.

Typically, each hub 38, 40 is supported on the spindle 32 with a pair of bearings, however, because the third bearing member 50 is incorporated between the hubs 38, 40 only a single bearing 34a, 34b is needed to support each hub 38, 40 on the spindle 32. This reduces the number of bearings required and eases the bearing preload process for the wheel, which in turn reduces cost and assembly time.

Preferably, the third bearing member 50 is positioned between the bearings 34a, 34b and has a diameter that extends a greater radial distance away from the axis 30 than the diameters of the bearings 34a, 34b supported by the spindle 32.

Figure 3:
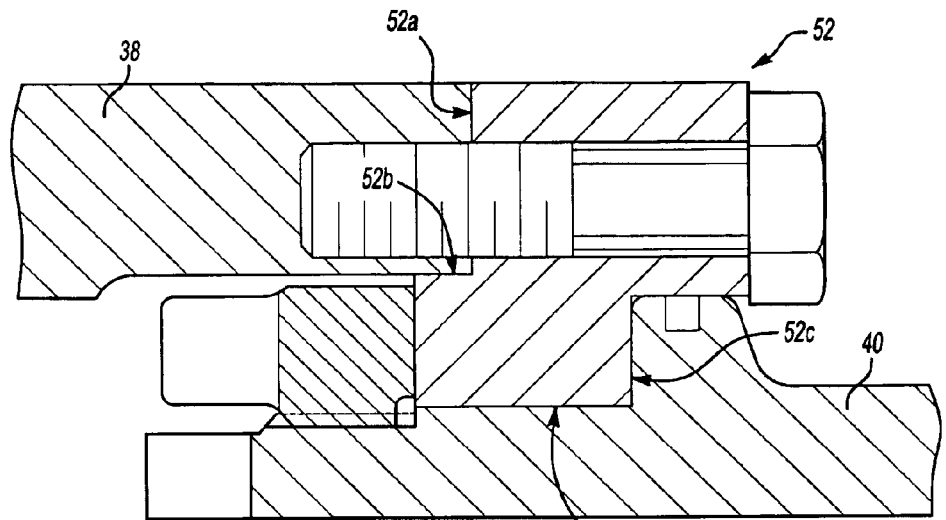
FIG. 3 is a cross-sectional view of a bushing.

Any suitable type of bearing member known in the art can be used for the third bearing member 50, however, the preferred bearing configuration is a bushing 52, as shown in FIG. 3. The bushing 52 is mounted between the first 38 and second 40 wheel hubs and axially and radially engages the first 38 and second 40 wheel hubs relative to the axis 30 to support bi-directional axial and radial loads. The bushing 52 includes first 52a and second 52b abutting surfaces perpendicular to one another. The first abutting surface 52a axially engages the first wheel hub 38 relative to the axis 30. The second abutting surface 52b radially engages the first wheel hub 38 relative to the axis 30. The bushing also includes first 52c and second 52d bearing surfaces perpendicular to one another and parallel to the first 52a and second 52b abutting surfaces, respectively. The first bearing surface 52c axially engages the second wheel hub 40 relative to the axis 30. The second bearing surface 52d radially engages the second wheel hub 40 relative to the axis 30. The bushing 52 can be made from a single type of material or can include a coating. For example, the bushing 52 can be a typical bronze bushing such as that found in traditional planet pinion shafts or a nylon-coated steel bushing.

Figures 4, 5:
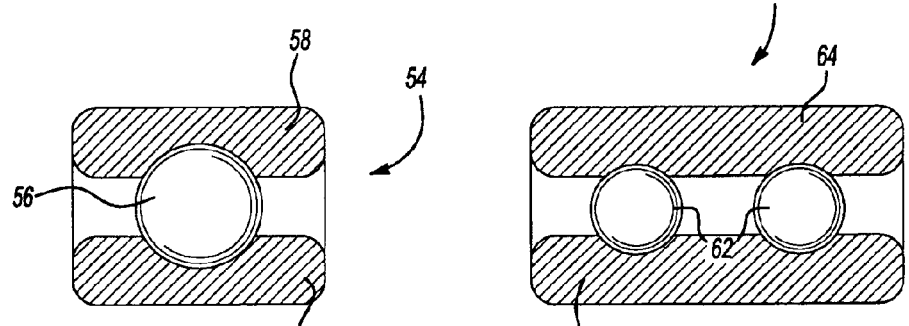
FIG. 4 is a schematic view of a ball bearing assembly.
FIG. 5 is a schematic view of a double-row angular contact ball bearing.
Figure 6A:
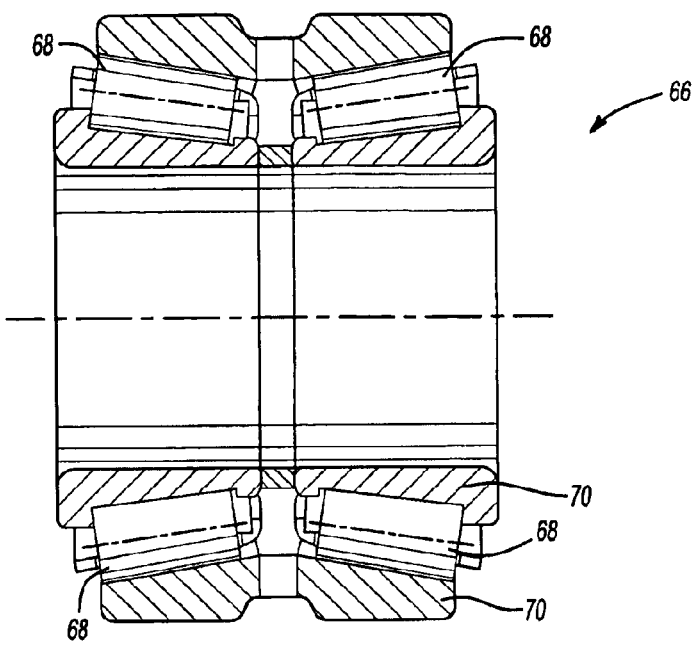
FIG. 6a is a schematic view of a taper roller bearing.
Figure 6B:
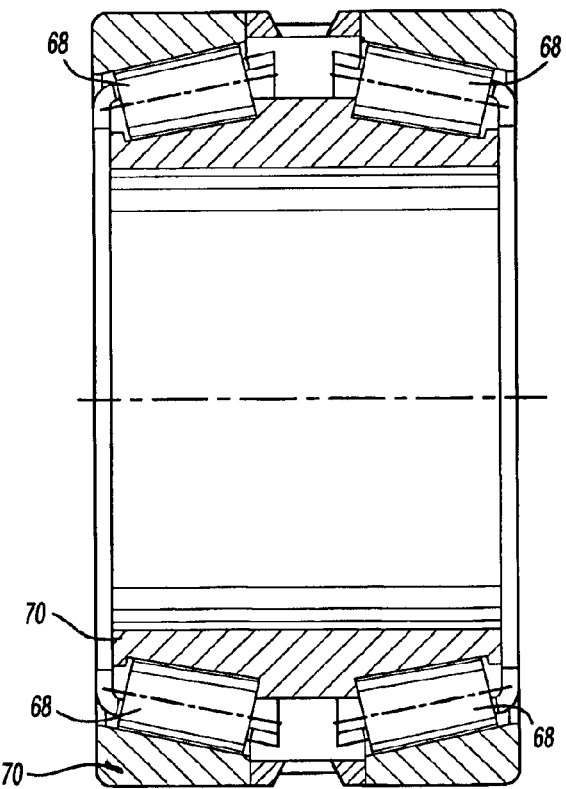
FIG. 6b is an alternate view of a taper roller bearing.

Other alternate bearing configurations include a radial four-point-contact ball bearing, a radial crossed roller bearing, a double-row angular-contact ball bearing, or a double-row taper roller bearing. A typical ball bearing 54 is shown in FIG. 4 and includes a plurality of spherical balls 56 supported on races 58 in a single row. A double-row angular-contact ball bearing 60 is shown in FIG. 5 and includes two (2) rows of spherical ball members 62 supported on a pair of races 64. Alternate embodiments of a double-row tapered roller bearing 66 are shown in FIGS. 6a and 6b, each of which includes two (2) rows of cylindrical bearing members 68 supported on races 70.

The third bearing member 50 can be of lower capacity than typical wheel bearing members because the number of revolutions is significantly reduced as it rotates only during turns.

Figure 7:
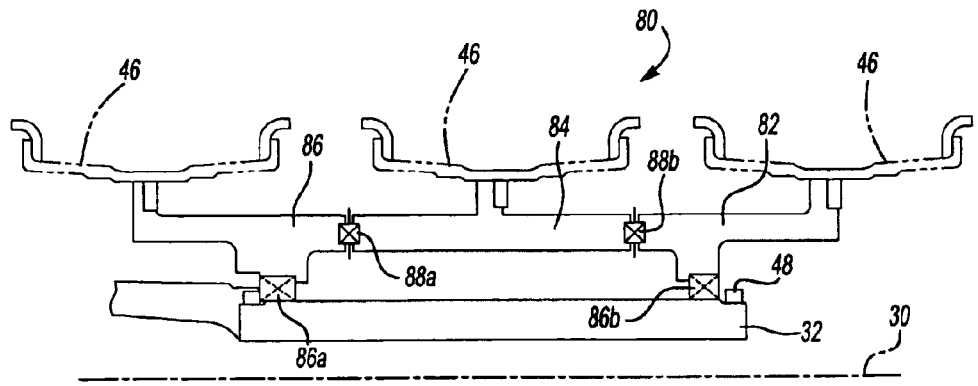
FIG. 7 is a cross-sectional view of a top half of an alternate embodiment of a wheel end assembly incorporating the subject invention and showing more than two wheels on the same axle end.

An alternative embodiment of a wheel end assembly 80 is shown in FIG. 7, illustrating that the concept can be extended to more than two wheels. This wheel end assembly 80 includes an outer wheel hub 82, a middle wheel hub 84, and an inner wheel hub 86. The inner 86 and outer 82 hubs are supported on the spindle 32 via first and second bearing members e.g. Bearings 86a, 86b, for rotation about the axis 30. It should be understood that the bearings 86a, 86b can be the same but do not have to be equal with each other. The fastening assembly retains the hubs 82, 84, 86 on the spindle 32. Wheel rims 46 are mounted to each of the hubs 82, 84, 86 as is known in the art. Third and fourth bearing members 88a, 88b are positioned between the hubs 82, 84, 86 to allow independent rotation of the hubs 82, 84, 86 relative to each other. The third bearing member 88a is positioned between the inner 86 and middle 84 hubs and the fourth bearing member 88b is positioned between the outer 82 and middle hubs 84. The bearing members 88a, 88b are similar to those discussed above with regard to FIG. 2.

The subjection invention provides a multiple wheel end assembly with independently rotating wheel hubs that greatly reduces tire wear, increases fuel economy, improves vehicle stability, and reduces premature wheel end component wear.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel end assembly comprising:
   a spindle defining an axis of rotation;
   a first wheel hub supported for rotation about said axis;
   at least one first bearing member supporting said first wheel hub on said spindle for rotation about said axis;
   a second wheel hub supported for rotation about said axis adjacent to said first wheel hub;
   at least one second bearing member supporting said second wheel hub on said spindle for rotation about said axis; and
   at least one bushing mounted between said first and second wheel hubs and axially and radially engaging said first and second wheel hubs relative to said axis to support axial and radial loads between said first and second wheel hubs thereby permitting said first and second wheel hubs to rotate independently from each other.

2. An assembly as set forth in claim 1 including a fastener mounted on one end of said spindle to prevent linear movement of said first and second wheel hubs along said axis.

3. An assembly as set forth in claim 1 wherein said at least one first bearing member is a single bearing and said at least one second bearing member is a single bearing.

4. An assembly as set forth in claim 1 wherein said bushing is a bronze bushing.

5. An assembly as set forth in claim 1 wherein said bushing is a nylon-coated steel bushing.

6. An assembly as set forth in claim 1 wherein said bushing is solely supported between said first and second wheel hubs to permit said first and second wheel hubs to rotate independently from each other under predetermined conditions.

7. An assembly as set forth in claim 1 wherein said bushing is located at a greater radial distance away from said axis than said first and second bearing members.

8. An assembly as set forth in claim 1 wherein said bushing includes first and second abutting surfaces perpendicular to one another and said first abutting surface axially engages said first wheel hub and said second abutting surface radially engages said first wheel hub.

9. An assembly as set forth in claim 8 wherein said bushing includes first and second bearing surfaces perpendicular to one another and said first bearing surface axially engages said second wheel hub and said second bearing surface radially engages said second wheel hub.

10. A wheel end assembly comprising:

a spindle defining an axis of rotation;

an inner wheel hub supported for rotation about said axis;

at least one first bearing member supporting said inner wheel hub on said spindle for rotation about said axis;

an outer wheel hub supported for rotation about said axis;

at least one second bearing member supporting said outer wheel hub on said spindle for rotation about said axis;

a middle wheel hub positioned between said inner and outer wheel hubs for rotation about said axis;

at least one third bearing member mounted between said inner and middle wheel hubs to permit said inner and middle wheel hubs to rotate independently from each other; and at least one fourth bearing member mounted between said middle and outer wheel hubs to permit said middle and outer wheel hubs to rotate independently from each other.

11. An assembly as set forth in claim 10 wherein said at least one third bearing member is solely supported between said inner and middle wheel hubs to permit said inner and middle wheel hubs to rotate independently from each other and wherein said at least one fourth bearing member is solely supported between said middle and outer wheel hubs to permit said middle and outer wheel hubs to rotate independently from each other.

12. An assembly as set forth in claim 10 including at least one fastening element retaining said wheel hubs on said spindle to prevent linear movement of said wheel hubs along said axis.

* * * * *